UNITED STATES PATENT OFFICE.

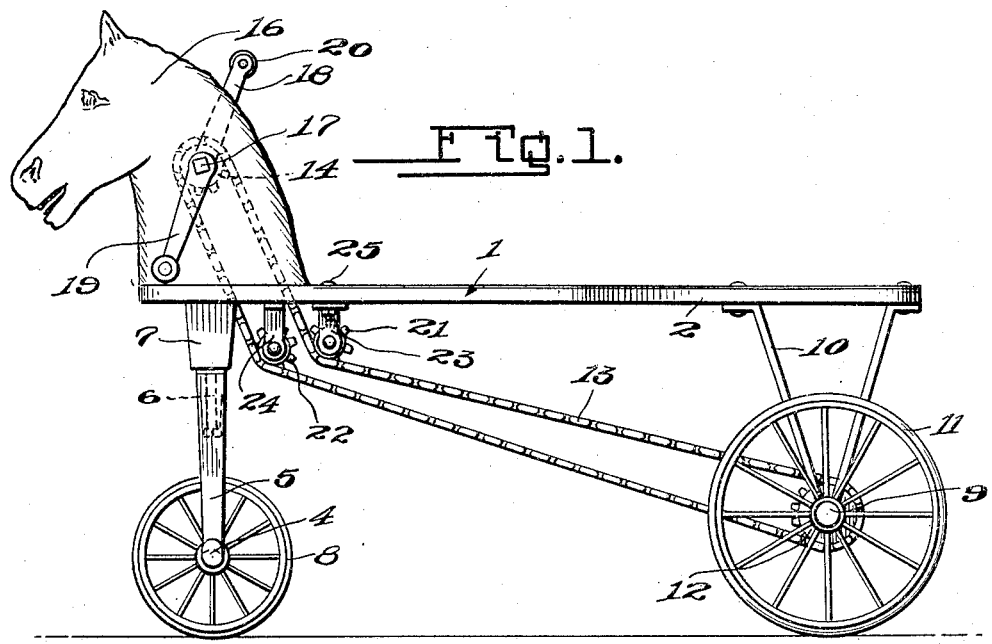
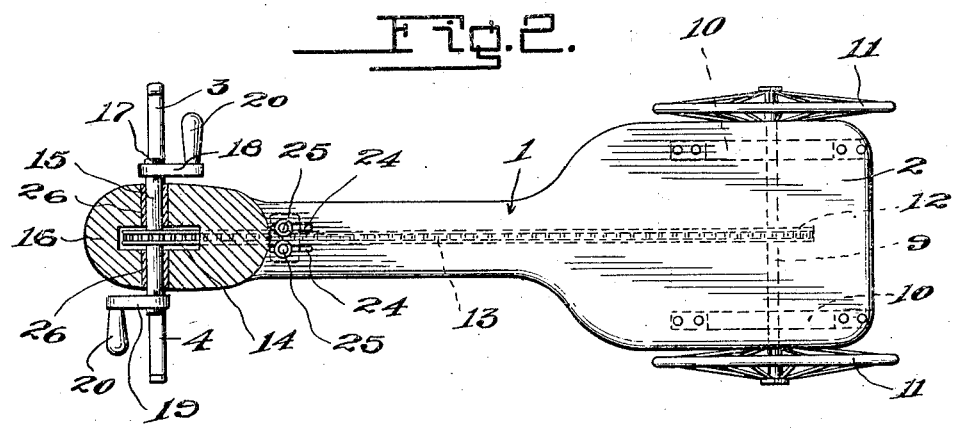

ALBERT H. DAVIDSON, OF HUNTINGTON, WEST VIRGINIA.

CHILD'S VEHICLE.

1,359,674.

Specification of Letters Patent.

Patented Nov. 23, 1920.

Application filed February 13, 1919. Serial No. 276,728.

*To all whom it may concern:*

Be it known that I, ALBERT H. DAVIDSON, a citizen of the United States, residing at Huntington, in the county of Cabell and State of West Virginia, have invented certain new and useful Improvements in Children's Vehicles, of which the following is a specification.

This invention relates to children's vehicles and an object of the invention is to provide a vehicle, of the type commercially known as "Kiddy Kars," in which the vehicle is propelled by the rotation of the shaft having a pair of handles disposed in opposed relation upon its ends which shaft is rotated by the arms of the child thereby allowing exercise of the arms and shoulders of the child during the propelling of the vehicle.

A further object of the invention is to provide a child's vehicle as specified wherein the front wheel is supported by an axle carried by a pivoted yoke which axle has foot rests on its end portions by means of which the child may steer the vehicle with his feet.

Other objects of the invention will appear in the following detailed description, taken in connection with the accompanying drawings, forming a part of this specification, and in which drawings:

Figure 1 is a side elevation of the improved child's vehicle and,

Fig. 2 is a top plan of the vehicle illustrating parts in section.

Referring more particularly to the drawings, 1 indicates the main body board or support of the vehicle, which has its rear portion 2 relatively wide to provide a seat for the child, while its front portion is narrow to permit the child to straddle this front narrow portion so that he may place his feet upon the foot rests 3 and 4 which are formed upon the ends of the front axle of the vehicle. The front axle, which carries the foot rests 3 and 4 is rotatably supported at the lower end of a yoke 5. The yoke 5 is mounted for movement about a vertical axis to a suitable depending block 7, as at 6, which is secured to the lower surface of the body 1 at the forward end thereof. The front axle has a wheel 8, of any approved construction mounted thereon.

The rear axle 9 is rotatably supported beneath the rear end of the body 1 by suitable hangers 10 and it has supporting wheels 11 mounted upon each end thereof. A sprocket 12 is mounted upon the rear axle 9 intermediate its ends, and a chain 13 passes about this sprocket and about the sprocket 14. The latter sprocket 14 is mounted upon a shaft 15 which is rotatably supported by an upstanding member 16 mounted upon the forward end of the body 1. This upstanding member 16 may be of any desired shape, such as a horse's head or the like for pleasing the child. The ends of the shaft 15 are rectangular in cross section as indicated at 17 and these rectangular ends have handles 18 and 19 mounted thereupon. The handles 18 and 19 extend in opposed relation from the axis of the shaft 15, and the hand grips 20 carried by the axis are adapted to be engaged by the hands of the child riding upon the body 1, for rotating the shaft 15 and consequently rotating the rear axle 9 through the medium of the sprockets 12 and 14 and the sprocket chain 13.

Idler sprockets 21 and 22 are supported by suitable brackets 23 and 24 and these idler sprockets engage the chain 13 to guide the movement of the runs of the chain between the sprockets 12 and 14. The bracket 23 may be adjustably supported by the body 1 as shown in Fig. 2 of the drawings, such as by the provision of slots 24 formed in the reduced forward portion of the body in which slots bolts 25 engage for holding the bracket 23 in various adjusted positions for properly tensioning the sprocket chain 13.

The shaft 15 may be rotatably supported in suitable bearing sleeves 26 if desired.

From the foregoing description taken in connection with the accompanying drawing, it will be apparent that a child's vehicle, the propelling of which will cause the exercise of the arms and shoulders of the person riding upon the same, and will leave the child's feet and legs free to steer the vehicle through the medium of the foot rests 3 and 4 which are formed upon the ends of the front axle of the vehicle.

Changes in details may be made without departing from the spirit of this invention, but; I claim:

1. In a child's vehicle, the combination, of a body, a rear axle supported beneath said body, an upstanding member carried at the forward end of said body, a shaft rotatably supported by said upstanding member, sprockets carried by said shaft and by said rear axle, a sprocket chain connecting said sprockets for rotating the rear axle by rotation of said shaft, a pair of idler sprockets extended beneath said body and engaging said sprocket chain, means adjustably connecting one of said idler sprockets to said body for independent movement in relation to the other sprocket to permit the tensioning of the sprocket chain, and a steering wheel carried by the forward end of the body.

2. In a child's vehicle, the combination, of a body, a rear axle supported beneath said body, an upstanding member carried in the forward end of the body, a shaft rotatably supported by said upstanding member, sprockets carried by said shaft and said rear axle, a sprocket chain connected to said sprocket for rotating the rear axle by rotation of said shaft, a bracket rigidly supported by said body depending therefrom, a second bracket adjustably carried by said body and depending therefrom, idler sprockets carried by said brackets and engaging said sprocket chain, said adjustable bracket adapted to be adjusted toward or away from the other bracket to permit the tensioning of the sprocket chain.

ALBERT H. DAVIDSON.